United States Patent [19]
Jacob et al.

[11] 4,227,515
[45] Oct. 14, 1980

[54] DUAL PHASE SOLAR WATER HEATER

[76] Inventors: Robert I. Jacob, 614 N. Palmetto Ct.; Paul E. Jacob, Rte. 2, Box 658-D, both of DeLand, Fla. 32720

[21] Appl. No.: 31,059

[22] Filed: Apr. 18, 1979

[51] Int. Cl.³ .............................. F24D 5/04; F24J 3/02
[52] U.S. Cl. ...................................... 126/427; 126/429
[58] Field of Search ........................ 126/427, 428, 429

[56] References Cited
U.S. PATENT DOCUMENTS

| | | | |
|---|---|---|---|
| 4,059,226 | 11/1977 | Atkinson | 126/427 |
| 4,132,356 | 1/1979 | Ramer | 126/427 |
| 4,137,098 | 1/1979 | Field | 126/429 X |

*Primary Examiner*—George T. Hall
*Attorney, Agent, or Firm*—Duckworth, Hobby, Allen & Pettis

[57] ABSTRACT

A solar energy conversion apparatus having two phases of operation which, in one phase, absorbs thermal energy from sunlight incident on the device, and in a second phase, absorbs energy from air in an attic-type space heated by solar radiation. The two phases may be utilized independently or in concert dependent upon conditions. A solar energy collector is disposed to collect and transfer incident solar energy to a fluid, such as water, flowing through the collector. A heat exchanger is disposed to permit flow of heated air therethrough from an attic-type space in a building, such air having been heated by solar energy incident on the roof of the building. The heat exchanger transfers heat from the air to a fluid, such as water, flowing therethrough. The solar collector and heat exchanger are connected via a plurality of valves and a pump to a water storage tank. Temperature sensors associated with the solar collector, the heat exchanger, and the water storage tank operate a control system which controls the valves and pump to determine the phases of operation of the system.

20 Claims, 6 Drawing Figures

DUAL PHASE SOLAR WATER HEATER

BACKGROUND OF THE INVENTION

1. Field of the Invention

This invention relates to a solar water heater and particularly to a dual phase solar water heater in which solar energy is absorbed from radiation and from convection of air.

2. Description of the Prior Art

With the increased emphasis on conservation of energy derived from fossil fuels, as well as the cost of electrical power, the use of solar energy for heating water for commercial and domestic use has become of great interest. Many versions of solar panels are now available which utilize a collector or back plate with a grid of fluid conduits attached in a heat-conductive relationship to the plate. A transparent cover is generally placed over the panel to minimize re-radiation of collected heat. Such panels are relatively expensive and usually the initial investment in panels for water heating will require several years to amortize through savings in costs of other sources of energy. For a typical home or other building, solar energy is also being absorbed by the roof structure not covered by solar energy panels. In a building having an attic space, the air in this attic space will be increased in temperature due to conduction of the absorbed thermal energy through the roof. In the majority of buildings, the energy thus absorbed from the solar radiation is not only wasted but presents a problem in air conditioning of the building, requiring significant amounts of ceiling insulation to prevent heat flow to the room below. In many buildings, an exhaust fan is utilized to reduce the attic temperature to minimize losses of air conditioner efficiency. Thus, not only is this collected heat energy wasted, but additional costs are involved in getting rid of the heat.

Therefore, it is evident that a technique for obtaining useful work from the attic heat which would significantly increase the efficiency of the solar heating system is needed.

SUMMARY OF THE INVENTION

The present invention is a dual-phase solar energy apparatus which, in one phase, absorbs thermal energy from sunlight incident on the device, and in a second phase, absorbs energy from heated air trapped in an attic-type space of a building. These two phases of operation may be independent, that is, one may operate with the other non-operating and vice-versa, or both phases may advantageously be in operation at the same time, with the mode of operation dependent on certain conditions of the system. A common use for the apparatus is the heating of water for domestic or commercial use.

The apparatus to practice this invention may take a number of forms, as will be evident to those of skill in the art from the description contained herein. An exemplary mode of the dual-phase solar heat collector may be a conventional-appearing solar energy collector or panel having a fluid-carrying grid formed from a continuous tube secured to a base plate and installed in a suitable housing having a transparent heat-conducting panel such as glass over the collector area. Directly beneath and thermally insulated from the solar collector panel another fluid-carrying grid formed from a continuous tube may be arranged which may have radiation fins along its external surface. This lower grid is enclosed in a box-like continuation of the solar panel structure having a vent or exhaust opening at one end. At the opposite end from the vent opening, a downward-extending vertical duct is located, having an inlet with an exhaust fan mounted therein. As may be recognized, the lower section comprises a heat exchanger. Assuming, for example, that the dual-phase solar heat collector is to be mounted on a sloping roof with a southerly orientation, an opening is then cut in the roof to receive the downward-extending duct from the collector. When the exhaust fan is in operation, heated air is drawn from the attic of the building and passes over the finned tubing and exits through the exhaust opening, transferring heat to the fluid carried by the tubing. A storage tank is provided in the building for the fluid to be heated and connected to the collector grids via a pump provided to move the water through the two grids. Three-way valves are interposed in the feed and return lines from the upper tubing grid and the lower tubing grid. These valves may be controlled to cause the pump to circulate fluid through only the upper grid or only the lower grid. In another mode, the valves may be controlled to cause the pump to circulate fluid through both grids in series with the lower grid receiving fluid from the pump and the upper grid delivering the heated fluid back to the storage tank.

Heat sensors are disposed at appropriate points in the system and used in conjunction with a controller to operate the valves, the pump, and exhaust fan as required in accordance with the invention. Four modes of operation are possible. The first mode is a non-operate mode in which neither the pump nor the fan is in operation, the valves are in a neutral position, and circulation is cut off. This condition obtains when there is no sun incident on the solar collector and the attic air temperature is lower than the temperature of the fluid in the storage tank. A second mode is utilized when the temperature of the solar collector is higher than the temperature of the fluid in the tank and the attic air temperature is lower than the fluid temperature. In this case, the pump operates with valve settings causing circulation of fluid from the cold side of the tank through the upper solar grid, returning to the hot side of the tank. The temperature sensors will cause the pump to run when the fluid temperature is less than the temperature sensed at the solar collector surface and to turn off when the fluid temperature approaches the solar grid temperature. A third mode is utilized when the solar collector is at a lower temperature than the fluid, for example at night or when there is no sunshine, and there is significant heat stored in the air in the attic, such that the temperature of the lower grid is greater than that of the tank fluid. In this condition, the valves will be re-set so the pump circulates fluid only through the lower heat exchanger grid and back to the tank. At a point at which the fluid temperature becomes greater than the attic air temperature, for example as the building cools off at night, the control will revert to the first mode, turning the pump off and the valves to the neutral position. The fourth mode may occur on a clear day with adequate sunshine such that the temperature of the air in the attic, and consequently of the lower grid, and the temperature of the solar collector section are both greater than the temperature of the tank fluid. The controller then adjusts the valves to effectively place the two grids in series, causing the pump to circulate fluid first through the lower heat exchanger grid and then through the upper solar collector grid back to the tank. As may be noted, if the heat is exhausted from the attic faster than it may be replaced by the sun, the attic temperature may drop below the temperature of the circulating fluid, in which case the system would revert to the second mode.

The invention thus is suitable for a two-phase solar water heater, with one phase heating water by absorption of direct solar radiation, and the other phase by use of attic air as a transfer medium from the solar radiation incident on a roof surface not covered by the solar panels. Utilized as a water heater, the invention may circulate the water to be heated directly through the solar collector and the heat exchanger, or a second fluid may be used as a heat transfer medium, with a fluid-to-water heat exchanger in the water storage tank. The invention therefore provides a solar energy collector for heating water, having higher efficiency for a given surface area than those of the prior art and having the advantages of utilizing heat otherwise wasted and, at the same time, removing heat from the attic space increasing the efficiency of the building air conditioning system. The cost of the extra tubing is significantly less than the cost of an additional collector since no back plate or glass cover are required.

It is therefore a principal object of the invention to provide a dual-phase solar energy apparatus that utilizes both direct sunlight energy incident thereon and the heat stored in the air of an attic from the solar energy incident on the entire roof area of the building for heating of a fluid.

It is another object of the invention to provide a controller and valve system for a dual-phase solar energy apparatus which can allow the apparatus to operate in three active modes.

It is yet another object of the invention to provide a dual-phase solar energy apparatus which can transfer solar energy stored in heated attic air to a fluid when there is no sunshine incident on the solar collector portion thereof.

It is a further object of the invention to provide a dual-phase solar energy apparatus that will absorb energy from incident sunlight and from heated attic air simultaneously.

It is yet a further object of the invention to provide a dual-phase solar energy apparatus that will usefully remove heated attic air from a building and thereby improve the efficiency of the building air conditioning system.

It is still a further object of the invention to provide a dual-phase solar energy apparatus admirably suited for heating water, thereby conserving fossil fuel energy.

These and other objects and advantages of the invention will be apparent from a reading of the detailed description below in view of the drawings.

BRIEF DESCRIPTION OF THE DRAWINGS

FIG. 3 illustrates the system conditions when the solar collector section temperature is greater than the supply water temperature and the attic heat collector portion is less than such water temperature;

FIG. 4 illustrates the system conditions when both the solar energy collector and the attic heat energy collector temperatures are greater than the temperature of the supply water;

FIG. 5 illustrates the system conditions when the solar energy collector temperature is less than the supply water temperature and the attic heat collector temperature is greater than such water temperature.

DETAILED DESCRIPTION OF THE PREFERRED EMBODIMENT

Figure 1:
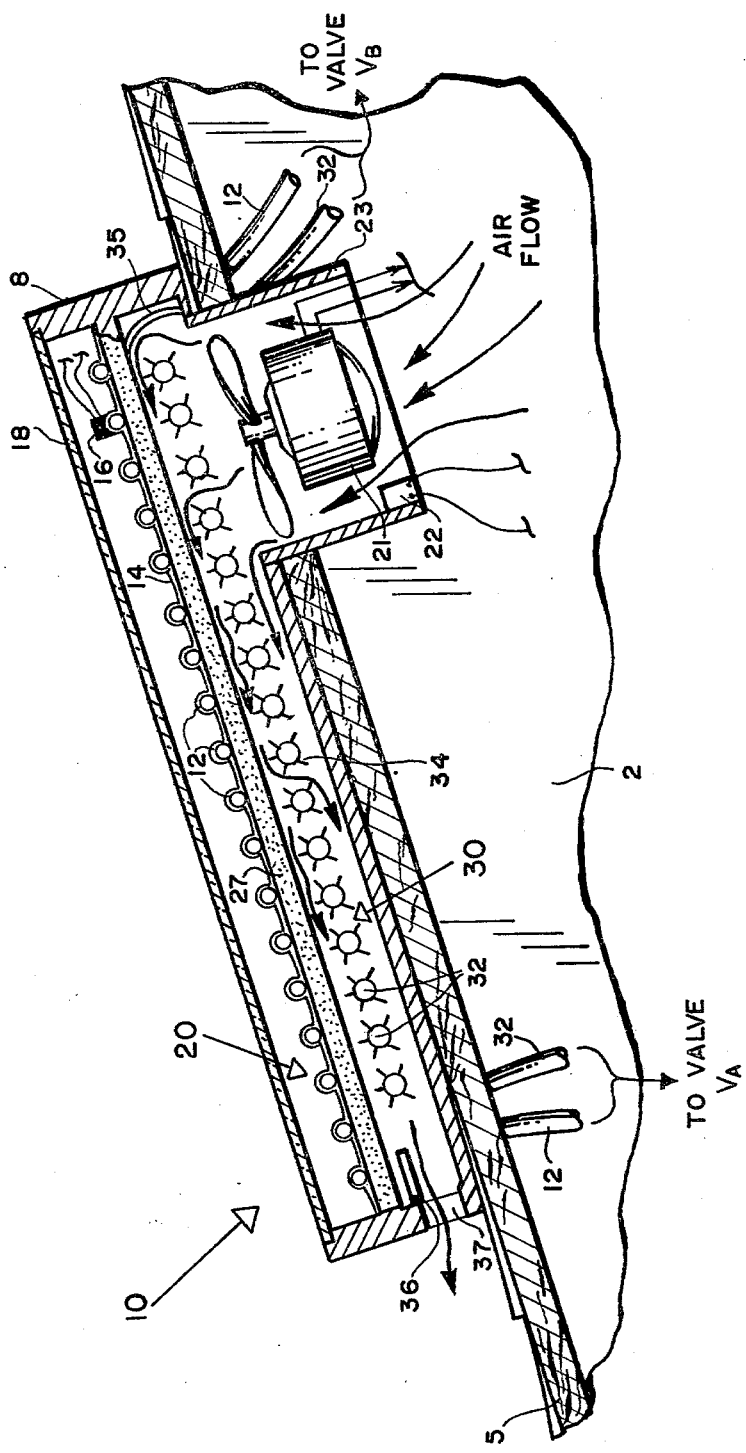
FIG. 1 is a sectional view of a roof structure having an attic with the dual phase solar water heater energy collector of the invention installed therein with the dual phase solar water heater panel shown in cross-sectional view.

While the invention may take many forms and embodiments, it will herein be described as applied to a solar water heater. The invention consists of basically three elements. First in FIG. 1, a dual-phase solar energy collector shown generally at 10 is to be mounted on the roof of a building. Next, three-way valves 42, 44, two-way valve 47, and a pump 46 shown in FIGS. 2 through 5 are utilized to control the flow of water through the energy collector 10, from and to a storage tank 50 for storage of the heated water. Finally, as shown in functional diagram form in FIG. 6, a controller is provided to set the valve positions, and control the pump and fan operation as required by the temperatures read from several sensors.

Turning first to FIG. 1, a cross-sectional view of the dual-phase solar energy collector 10 is shown installed on a roof 5, also shown in cross-section. An opening in roof 5 is provided for inlet duct 23 which contains exhaust fan 21. Directly below roof 5 is attic area 2 and, as is usual in a building with attic construction, no insulation is provided for the roof 5 per se. Thus, the solar energy incident on roof 5 will flow by conduction through the roof structure, heating the air in attic 2. As is well known, the air temperature in summer months may reach 125° F. and higher.

Energy collector 10 consists of two sections contained in a framework 8. The sections are formed by an insulating divider 27 separating frame 8 into an upper and lower volume or section. The upper volume contains a solar energy collector section indicated generally by 20. This collector panel may take the form of any of the wide variety of such solar energy collectors that have been developed in recent years and is preferably mounted with an orientation and angle which will cause the panel to collect a maximum of solar energy for the particular latitude of the location. Purely for exemplary purposes, FIG. 1 illustrates a conventional tube grid and back plate type collector. Shown in cross-section is solar collector water-carrying grid 12 which is a representation of a continuous tube, such as copper, folded back and forth and soldered or welded to a copper collector back plate 14 in a heat-absorbing relationship. A glass cover 18 is disposed over the collector grid 12 and back plate 14 as is conventional.

The attic air heat collector is disposed in the lower section shown generally at 30. This collector consists of a continuous tube grid 32 for carrying water and preferably having fins 34 disposed externally along the tubing. Alternatively, a radiator type grid such as used in automobiles and air conditioner condensers may be used. At one end of the frame 8, an inlet duct 23 is disposed communicating from attic 2 into attic air heat collector 30. An exhaust fan 21 is mounted in duct 23 for drawing the hot air from attic 2 and circulating the air through and around the finned heat exchange grid 32 exhausting the air through port 37 at the opposite end of frame 8 from fan 21. Water flowing through heat exchange grid 32 will thereby absorb heat from the hot air circulating around grid 32. The space containing the attic air heat collector 30 may be baffled as shown at 35 to effectively direct the flow of hot air. A damper 36 may be provided over the exhaust opening 37 to be closed during winter months or periods for which operation of the system is not required. The inlet tubing of the grids 32 and 12 are indicated at the upper end of collector 10 and the outlet tubing at the lower end. These feed tubes connect to the valves as explained in detail hereinbelow.

Figure 2:
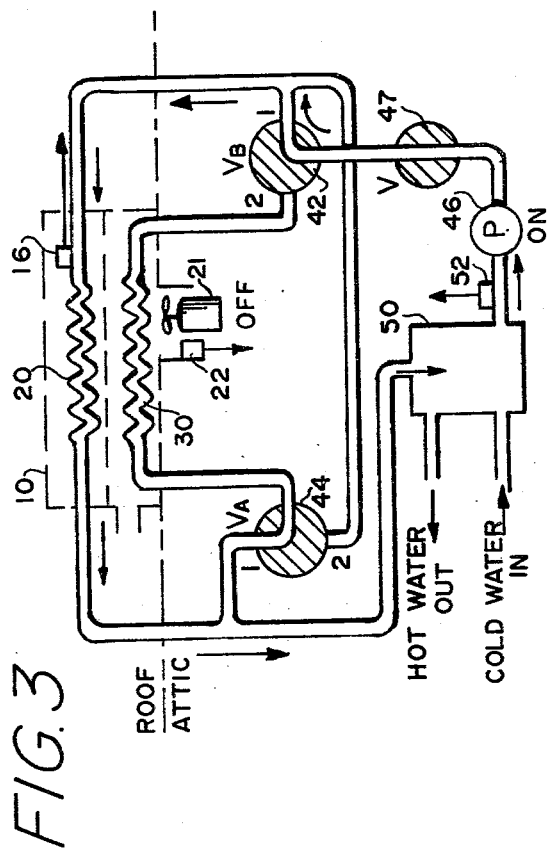
FIGS. 2, 3, 4 and 5 are schematic diagrams of the solar water heater of FIG. 1 connected to a pump and water storage tank, with FIG. 2 indicating the system conditions when both the solar collector and the attic heat collector temperatures are less than the stored water temperatures.

Referring now to FIGS. 2 through 5, the operation of the invention will be described. The figures show additional elements of the invention. Valves 42 and 44 designated $V_b$ and $V_a$ may be conventional electrically operated three-way valves. Each valve has, as shown in FIG. 2, two ON positions designated position 1 and position 2, with examples of each shown in the FIGS. 3, 4 and 5. Three heat or temperature sensors are utilized in accordance with the invention. Solar sensor 16 is mounted adjacent to the inlet of solar heat collector 20. Attic sensor 22 is installed near duct 23 and senses the temperature of the air in the attic. Water sensor 52 is mounted at or near the cold water outlet of tank 50 ahead of pump 46 to sense the temperature of the water to be circulated through heat collector 10. Two-way valve 47 is a conventional electrically operated normally OFF type and is wired in parallel with pump 46 so that there can be no circulation of water when pump 46 is OFF.

Figure 3:
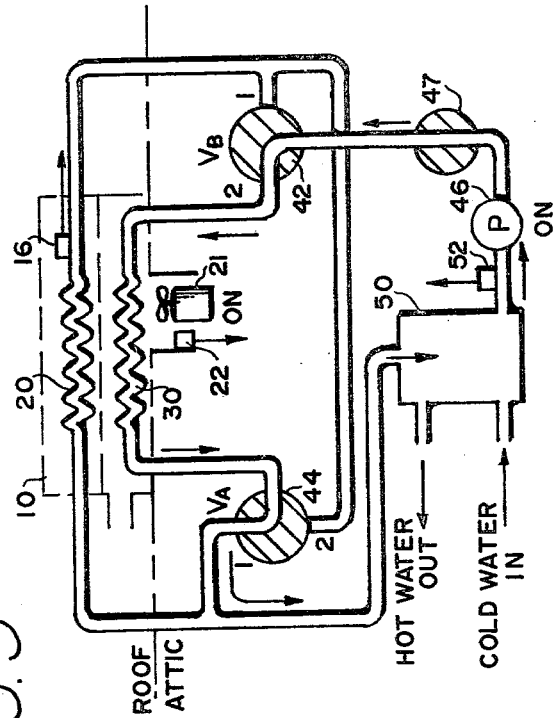
Figure 5:
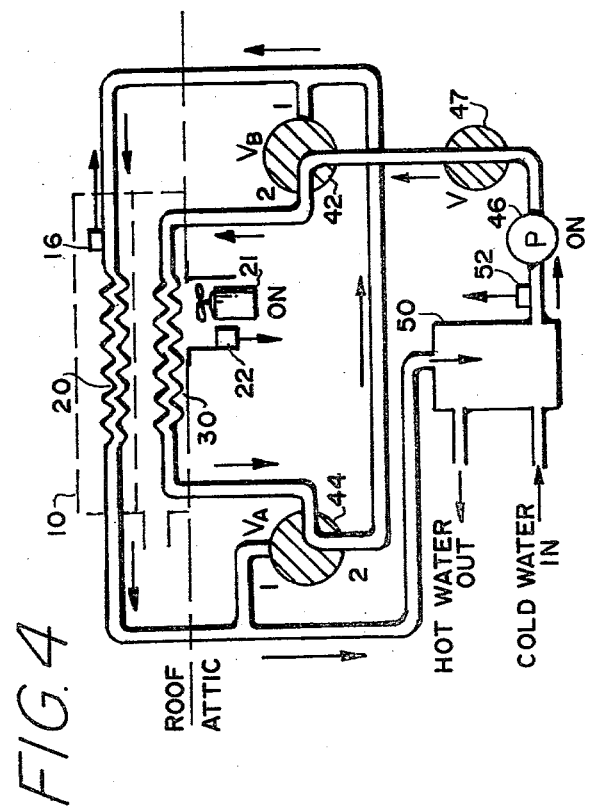

FIG. 2 illustrates schematically the position of valves 42, 44 and 47 and the status of pump 46 and fan 21 when the temperatures sensed by sensor 16 and 22 are both less than the temperature sensed by sensor 52. In this condition, it may be recognized that the water in storage tank 50 is at a higher temperature than either the attic air or the water in the solar collector 20. If the water were allowed to circulate in this case, there would be heat lost from the water to the ambient air surrounding collector 10. Consequently, pump 46 and valve 47 are maintained in the OFF position and valves 42 and 44 are both in neutral positions, preventing circulation of water by convection. By "neutral position" is meant that the two valves 42 and 44 are set so that there can be no circulation through a neutral position valve. Fan 21 is preferably OFF to allow the attic area to collect heat since operation of fan 21 before the attic air has become fully heated would result in exhaust of warm attic air slowing up the collection of heat energy therein. In FIG. 3, the temperature of sensor 16 has increased due to incident sunligh on solar collector 20 to the point that it exceeds the temperature found by water sensor 52. Sensor 22 is still sensing air temperature in the attic less than the tank water temperature. As a result of these conditions, valve 42 ($V_b$) is set to its position 1 which connects the pump 46 via valve 47 directly to the inlet of solar collector 20. Valve 44 ($V_a$) remains in neutral position since there can be no flow therethrough. As shown by the water flow arrows, pump 46 now circulates water drawn from tank 50 via valves 47 and 42 through solar collector 20 and back to tank 50. This mode will continue until the temperature of the water at the outlet of tank 50, as sensed by water sensor 52, approaches the temperature at the inlet of solar collector 20 as measured by solar sensor 16. At that point, the system would revert to the condition shown by FIG. 2.

Figure 4:
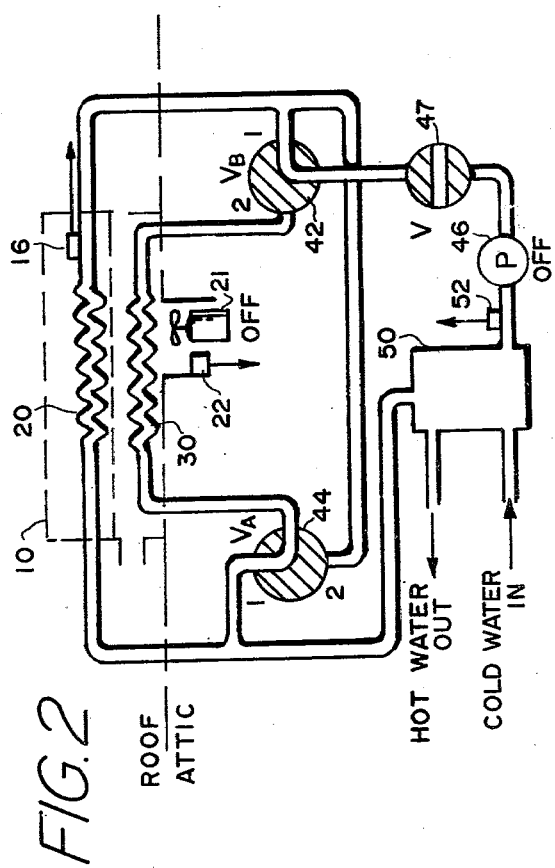

When the attic air temperature increases as measured by air sensor 22, and the temperature of solar collector 20 still exceeds the tank water temperature, valves 42 and 44 will both be switched to their position 2 as indicated in FIG. 4. Fan 21 is energized, moving hot air from the attic through attic air heat collector 30. Pump 46 is ON and circulates water from tank 50 via valves 47 and 42 through hot attic air collector 30, via valve 44 to the inlet of solar collector 20 and back to storage tank 50. This operation will continue until either air sensor 22, or solar sensor 16, senses temperatures less than the tank water temperature.

For conditions of no sunlight, such as after sundown or when heavy clouds may occur, and heat has previously been stored in the attic air, attic air sensor 22 may read a higher temperature than water sensor 52. If, at the same time, the water temperature at the inlet to solar collector 20 as read by solar sensor 16 is less than the tank water temperature as sensed by water sensor 52, the condition illustrated schematically in FIG. 5 will obtain. Here, valve 42 is set to its position 2 and valve 44 to its position 1. Pump 46 now circulates the water from tank 50 through attic air heat exchanger 30 via valve 42 and back to tank 50 via valve 44. Fan 21 is turned ON to circulate the hot air from the attic space through heat exchanger 30. At the time when the usable heat from the attic air has been absorbed, attic heat sensor 22 will drop relative to the water temperature measured by water sensor 52. When the comparative readings indicate no further heat transfer is possible, pump 46, valve 47, and fan 21 are turned OFF and valves 42 and 44 re-set to their neutral positions for the mode shown in FIG. 2.

The above discussion has related the readings of sensors 16, 22 and 52 as being greater than, or less than, various values for changing of mode of operation of the invention. However, to provide stable operation and minimize rapid cycling, it has been found desirable to utilize selected offset values and amounts of hysteresis in the control system to be described hereinafter. For example, when the system is in the solar collector only mode of FIG. 3, as the temperature of the water at sensor 52 rises to within 3° of the temperature measured by solar sensor 16, the pump 46 and valve 47 are advantageously switched OFF and valve 42 changed to a neutral position. Later, as hot water is drawn from tank 50 or the stored water cools from thermal loss, the differential increases to greater than 3°, reinitiating the mode of FIG. 3. This can also occur from increased solar heat absorption by solar panel 20, causing an increase in the differential. The particular offset temperature is preferably chosen to suit the particular installation with respect to angle and amount of solar radiation received, lengths of feed lines, volume of storage, rate of flow from pump and similar parameters. Such design variations are understood by those skilled in the art.

Figure 6:
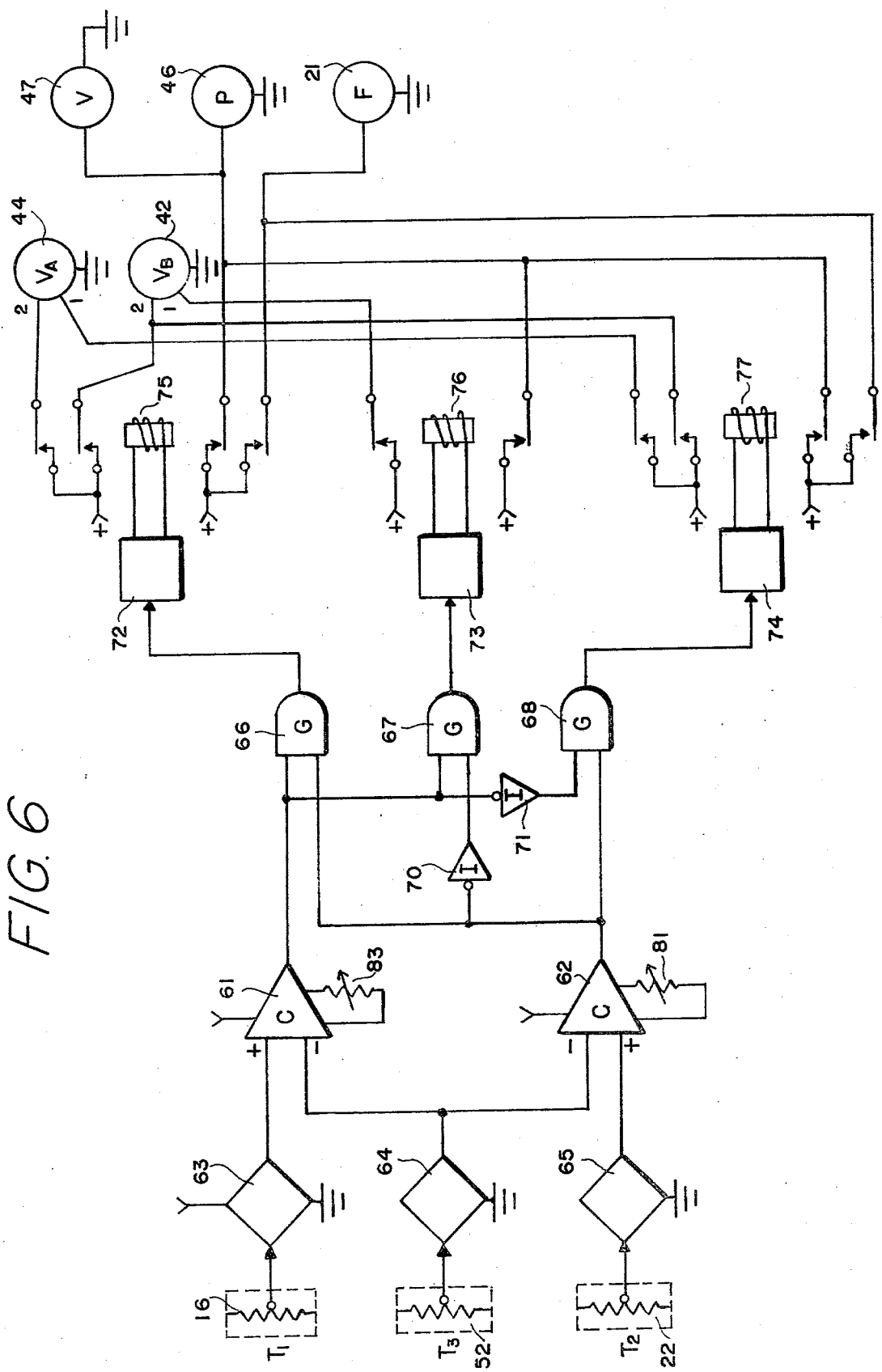
FIG. 6 is a simplified logic and functional block diagram of the control system for the invention illustrating how the pump, fan, and valves are set for the modes of operation shown in FIGS. 2 through 5.

Having hereinabove described the operation of the dual-phase solar water heater, the method of controlling the various elements will now be described. A controller is utilized in the invention and may be implemented by thermostatic, electro-mechanical, or electrical means. However, for purposes of explanation to indicate the logic incorporated therein, an electronic controller is shown in FIG. 6. Sensors 16, 22, and 52 are, in this case, electronic heat sensitive elements such as thermistors or the like. Thermistor 16 is connected in a conventional bridge circuit 63 to one input of comparator 61. Thermistor 52, which senses the tank water temperature, is connected in bridge circuit 64 as the reference input to comparator 61. Bridge 64 also supplies the reference input to comparator 62, and attic air thermistor 22 is connected to bridge circuit 65 supplying a signal to comparator 62. Comparator 61, responsive to the temperatures of sensor 16 and sensor 52, will therefore produce a logic level ONE at its output when temperature $T_1$ is greater than temperature $T_3$, and will produce a logic level ZERO when temperature $T_1$ is less than $T_3$. Similarly, comparator 62 will produce a logic level ONE at its output when temperature $T_2$ is greater than temperature $T_3$, and a logic level ZERO when temperature $T_3$ is greater than temperature $T_2$. It is desirable to offset the operating points of comparators 61 and 62 by about 3° or so. Thus, the comparator will operate only when the temperature differences are greater than this offset value, to prevent overshoot of the water temperature in the operation of the invention. Offset controls 81 and 83 are used to set the desired offset temperature. AND gates 66, 67 and 68 accept the outputs from comparators 61 and 62, performing the logic decisions as to the operation of valves 42, 44, pump 46 and fan 21. The output from comparator 61 feeds one input of AND gate 66 and of AND gate 67 directly and one input of AND gate 68 via inverter 71. Similarly, comparator 62 feed AND gate 66 and 68 directly, and AND gate 67 via inverter 70.

As may now be recognized, when the solar collector temperature $T_1$ is greater than the water temperature $T_3$ by at least the selected offset amount, comparator 61 will produce a ONE at gates 66 and 67 and inverter 71 will produce a ZERO at gate 68. If $T_2$ is less than $T_3$ by the offset, comparator 62 will produce a ZERO at gates 66 and 68, and inverter 70, a ONE at gate 67. Therefore, the outputs of gates 66 and 68 will be at ZERO level and gate 67 at ONE level. Accordingly, driver circuit 73 will energize relay 76, setting valve $V_b$ 42 to its position 1, and turning on pump 46 and valve 47. This condition corresponds to the second mode of FIG. 3 for circulation of water through solar collector 20 only. These logic operations are best shown by the following chart in which the "greater than" and "less than" symbols are understood to include the desired off-set temperature:

| Mode | Sensors | C-61 | C-62 | G-66 | G-67 | G-68 | R-75 | R-76 | R-77 |
|---|---|---|---|---|---|---|---|---|---|
| 1 | $T_1<T_3$ $T_2<T_3$ | 0 | 0 | 0 | 0 | 0 | OFF | OFF | OFF |
| 2 | $T_1>T_3$ $T_2<T_3$ | 1 | 0 | 0 | 1 | 0 | OFF | ON | OFF |
| 3 | $T_1>T_3$ $T_2>T_3$ | 1 | 1 | 1 | 0 | 0 | ON | OFF | OFF |
| 4 | $T_1<T_3$ $T_2>T_3$ | 0 | 1 | 0 | 0 | 1 | OFF | OFF | ON |

AND gate 66 is connected to relay driver circuit 72 and arranged to operate relay 75 when a logic level ONE appears at its output. AND gate 67 drives relay driver circuit 73 which operates relay 76 when a logic level ONE appears at its input. Similarly, AND gate 68 operates relay driver circuit 74, operating relay 77 in response to a logic ONE level. The contacts of relays 75, 76 and 77 are arranged to operate valves 42, 44, 47, pump 46 and fan 21 in accordance with the above table.

While the construction of a controller in accordance with the functional block diagram of FIG. 6 is obvious to those skilled in the art, a commercially available control system may be assembled using differential controllers such as the Honeywell 7412 model in combination with its associated sensors and relays, listed in the Appendix.

In the above-described embodiment of the invention, a single roof unit 10 is shown with the solar energy collector 20 and the heat exchanger 30 collocated. It is clear that multiple units connected in series or in parallel may be used advantageously to supply larger amounts of heat energy, limited only by physical parameters of the roof and attic spaces. It is also not necessary to collocate the two sections, and the heat exchanger 30 may be entirely within the attic space with its exhaust opening to the outside, or it may be in a separate housing from the solar collector 20. Other variations and embodiments will be obvious to those of ordinary skill in the art.

A novel two phase solar water heater has been described hereinabove, with one phase converting radiant solar energy incident on a solar collector directly to hot water, absorbing otherwise wasted heated attic air in a second collocated heat exchanger unit. A controller and control system has been described allowing the solar collector unit and the attic air heat exchanger unit to advantageously cooperate in accordance with the temperature conditions throughout the system to most efficiently extract available solar energy. The invention also advantageously improves the efficiency of air conditioning systems operative in the building in which the system is installed by removing heated air from the attic which otherwise would increase the load on the air conditioner. While a particular embodiment has been described, it is obvious that those of ordinary skill in the art may make various substitutions of different types of solar collectors and air heat exchangers without departing from the scope or the spirit of the invention. Similarly, various types of control devices can be utilized in accordance with the invention other than that described as an example herein. The most common anticipated use of the invention contemplates directly circulating water through the solar collector and heat exchanger. However, for use in very cold environments where freezing is a problem and for uses other than heating of water, any other suitable heat transfer fluids may be substituted for water for circulation through the apparatus and are considered to fall within the scope of the invention.

APPENDIX

The following commercially available control elements may be used in one embodiment of the invention:

| | |
|---|---|
| 2-Differential Controllers | Honeywell Model R-7412F |
| 1-solar sensor | Honeywell C-773C |
| 1-attic sensor | Honeywell C-773C |
| 1-water sensor | Honeywell C-773B |
| 2-three-way valves | Honeywell V8044A-10446 |
| 1-two-way valve | Alco 211CA, Emerson Electric |
| 1-pump | March Model 809 |

We claim:

1. A dual-phase solar energy apparatus for mounting on a roof of a building having an attic-type space or the like comprising:
   solar radiation absorption means for intercepting and absorbing solar radiation, said means having a first fluid-carrying grid for transferring absorbed energy to a fluid flowing therethrough;
   heat exchange means communicating with an attic-type space for receiving a flow of heated air therefrom, said latter means having a second fluid-carrying grid for transferring energy from the heated air to a fluid flowing therethrough; and
   control means for controlling the flow of an input fluid through said first grid of said solar radiation absorption means and through said second grid of said heat exchange means in accordance with the temperature of the input fluid relative to the temperature of said first fluid-carrying grid and to the temperature of the heated air.

2. The apparatus as defined in claim 1 in which said solar radiation absorption means comprises:
   a housing;
   an energy-absorbing back plate in heat conductive relation to said first fluid-carrying grid;
   a transparent cover spaced above said first fluid-carrying grid; and
   heat insulative material disposed below said back plate.

3. The apparatus as defined in claim 1 in which said heat exchange means comprises:
   an enclosed housing having an inlet opening and an exhaust opening, said housing containing said second fluid-carrying grid, and said inlet opening communicating with the attic space;
   an exhaust fan disposed in said inlet opening arranged to exhaust air from the attic space into said housing;
   whereby heated air from said attic space flows in heat exchange relationship to said second fluid-carrying grid and out through said exhaust opening.

4. The apparatus as defined in claim 1 in which said solar radiation absorption means and said heat exchange means are collocated, with said solar radiation absorption means open to solar radiation and said heat exchange means disposed immediately below said solar radiation absorption means and in a common housing means.

5. The apparatus as defined in claim 3 in which said control means comprises:
   input fluid-carrying lines to the inputs of said first fluid-carrying grid and said second fluid-carrying grid;
   first valve means interposed in said input lines;
   output fluid carrying lines from the output of said first fluid-carrying grid and said second fluid-carrying grid;
   second valve means interposed in said output lines; and
   fluid storage means connected to said first fluid-carrying grid and said second fluid-carrying grid via said input and output lines, said storage means for storing the fluid to be heated.

6. The apparatus as defined in claim 5 in which said control means further comprises:
   solar heat sensing means attached to said first fluid-carrying grid;
   attic air heat sensing means disposed at said inlet opening to said heat exchange means; and
   fluid heat sensing means disposed so as to measure the temperature of the fluid at the outlet of said storage means.

7. The apparatus as defined in claim 6 in which said control means includes pump means interposed between said storage means and said input lines for circulating said fluid through said first grid and said second grid via said first and second valve means.

8. The apparatus as defined in claim 7 in which said control means further comprises:
   controller means responsive to each of said temperature sensing means and arranged to cause fluid flow through said solar radiation absorption means when the temperature of said latter means is less than the temperature of the fluid at the outlet of said storage means to cause the fluid to flow through said heat exchange means when the temperature of the air in the attic space is greater than the temperature of the fluid at the outlet of said storage means and to cause the operation of said exhaust fan when fluid is flowing through said second fluid carrying grid.

9. The apparatus as defined in claim 8 in which said controller is arranged to cause the fluid to flow through said second fluid-carrying grid and thereafter to flow through said first fluid-carrying grid when both said solar heat sensing means indicate temperatures greater than that sensed by said fluid heat sensing means.

10. A dual-phase solar water heater comprising:
    solar radiation absorption panel adapted to be positioned to intercept solar radiation and to be heated by absorption of such radiation;
    first water-carrying tubing disposed in heat-conductive relation to said panel and having an inlet and outlet;
    first temperature sensing means attached to said first tubing for sensing the temperature of water therein;
    heat exchanger adapted to receive a flow of solar-heated air;
    second water-carrying tubing disposed in said heat exchanger in heat conductive relation to such flow of solar heated air, said second tubing having an inlet and outlet;
    second temperature sensing means disposed within said heat exchanger for sensing the temperature of the incoming flow of solar-heated air; and
    control means for controlling the flow of water through said first water-carrying tubing and through said second water-carrying tubing in accordance with the temperature sensed by said first temperature sensing means and the temperature sensed by said second temperature sensing means.

11. The water heater as defined in claim 10 in which said heat exchanger includes fan means for producing the flow of solar-heated air through said heat exchanger.

12. The water heater as defined in claim 11 in which said heat exchanger in adapted to be positioned immediately below said solar radiation absorption panel.

13. The water heater as defined in claim 12 in which said solar radiation absorption panel and said heat exchanger are adapted to be mounted on the roof of a building, and said heat exchanger to communicate with an attic space of said building for receiving solar-heated air from said attic space.

14. The water heater as defined in claim 10 in which said control means comprises:

water-carrying lines to the input of said first water-carrying tubing and said second water-carrying tubing;

first valve means interposed in said input lines;

output water-carrying lines from the outputs of said first water-carrying tubing and said second water-carrying tubing;

second valve means interposed in said output lines; and storage tank connected to said first water-carrying tubing and said second water-carrying tubing via said input and output lines.

15. The water heater as defined in claim 14 in which said control means further comprises:

valve control means connected to said first valve means and to said second valve means, and responsive to the temperatures sensed by first temperature sensing means and said second temperature sensing means.

16. The water heater as defined in claim 15 in which said control means further comprises water pump means for causing flow of water from said storage tank through said first water-carrying tubing and said second water-carrying tubing via said valves and said water-carrying lines, such flow of water being selectively controlled by said valve control means.

17. A dual-phase solar water heater utilizing solar radiation and solar heated air for mounting on roofs or the like comprising:

a box-like enclosure having an upper section and a lower section separated by a heat insulating barrier, said upper section being covered by a transparent heat transmitting panel;

a solar energy collector disposed in said upper section positioned to intercept and absorb solar radiation passing through said heat transmitting panel, said collector having a first water-carrying grid of tubing to be heated by absorption of such radiation;

a heat exchanger disposed in said lower section having a downward extending air inlet duct for communicating with an attic space, and an exhaust outlet, said heat exchanger having a second water-carrying grid arranged in heat absorbing relationship with heated air flowing from said inlet duct to said exhaust outlet; and fan means positioned adjacent said inlet duct for forcibly moving air from the attic space, through said heat exchanger, and out said exhaust outlet.

18. The solar water heater as defined in claim 17 which further comprises:

a storage tank for storing water to be circulated through said first and second water-carrying grids;

a pump for forcibly circulating water from said tank, through said first and second grids, and back to said tank;

valve means connected to said first and second grids, said pump, and said tank, for controlling such circulation of water, said valve means arranged to provide a first mode of circulation in which water from said tank circulates only through said first grid, a second mode of circulation in which water from said tank circulates only through said second grid, and third mode of circulation in which water from said tank circulates through said second grid and said first grid in a series relation; and control means connected to said valve means and said pump, said control means responsive to the temperatures of said first grid, such attic air, and the water in said tank for controlling said valve means to selectively achieve one of such modes of circulation as determined by pre-selected relationship among such temperatures.

19. The solar water heater as defined in claim 18 in which said control means comprises:

first heat sensor disposed in said solar energy collector for sensing a solar temperature;

second heat sensor disposed in said air inlet duct for sensing an air temperature;

third heat sensor disposed in said water tank for sensing a water temperature; and logic means connected to said first, second and third heat sensors for receiving signals therefrom proportional to the temperatures sensed thereby, said logic means arranged to cause water circulation in such first mode when the sensed solar temperature is greater than the sensed water temperature and the sensed air temperature is less than the sensed water temperature, in such second mode when the sensed solar temperature is less than the sensed water temperature and the sensed air temperature is greater than the sensed water temperature, or in such third mode when the sensed solar and air temperatures are both greater than the sensed water temperature.

20. A solar water heater as defined in claim 19 in which said control means is connected to said fan, and said logic means controls said fan to operate only in such second and third modes of circulation.

* * * * *